UNITED STATES PATENT OFFICE.

JOSEPH L. TURNER, OF PHILADELPHIA, PENNSYLVANIA, AND CHARLES E. VANDERKLEED, OF COLLINGSWOOD, NEW JERSEY, ASSIGNORS TO H. K. MULFORD COMPANY, OF PHILADELPHIA, PENNSYLVANIA, A CORPORATION OF PENNSYLVANIA.

PROCESS OF PREPARING ANTISEPTIC COMPOUNDS.

No. 906,473.     Specification of Letters Patent.     Patented Dec. 8, 1908.

Application filed July 15, 1907. Serial No. 383,868.

*To all whom it may concern:*

Be it known that we, JOSEPH L. TURNER, a subject of the Czar of Russia, and CHARLES E. VANDERKLEED, a citizen of the United States, residing, respectively, in Philadelphia, Pennsylvania, and Collingswood, New Jersey, have invented certain Improvements in Processes of Preparing Antiseptic Compounds, of which the following is a specification.

The object of our invention is to provide a process for the manufacture of an antiseptic compound which shall be odorless and tasteless and at the same time of such a nature as not to be readily ionized.

In carrying out our invention we treat a solution of albumen, nucleo-proteid or like substance with bismuth-oxyiodid in a nascent state, and then subject the product of the reaction, after boiling, to the action of formaldehyde;—subsequently filtering and drying the resultant product.

In actually carrying out our process we employ, for example, 15 lb. of nucleo-proteid such as casein dissolved in a solution of 14 lb. of sodium bicarbonate in 40 gal. of water. To this we add, first a solution of 2 lb. 12 oz. of sodium acetate and 1 lb. 15 oz. of potassium iodid in 2 gal. of water, and then a solution of 5 lb. 8 oz. of bismuth-nitrate and 13 pints of 50% acetic acid. The whole is then boiled for an hour and after being cooled, the precipitate is separated from the liquid by decantation or filtration. Said precipitate is then reacted upon with 8 pints of a 40% solution of formaldehyde, after which the precipitate is filtered off and dried at a moderate temperature.

Where albumen is employed we dissolve, for example, 16 lb. 10 oz. of egg albumen in a solution of 12 lb. 10 oz. of sodium bicarbonate in 40 gal. of water at ordinary temperature. A solution consisting of 2 lb. 12 oz. of sodium acetate and 1 lb. 15 oz. of potassium iodid is added to the above solution and followed by the addition of 5 lb. 5 oz. of bismuth nitrate dissolved in 13 pints of 50% acetic acid. The whole is then heated to boiling for one-half hour, and after being cooled, the precipitate is separated from the liquor by decantation or filtration. Said precipitate is then reacted upon with 8 pints of a 40% solution of formaldehyde, after which the precipitate is filtered off and dried at a moderate temperature.

The product resulting from the above described process is bismuth-oxy-iodid-anhydro-methylene proteid, and our reason for believing the above name to correctly describe it rests upon the fact that on treating amino acids with formaldehyde the latter combines with the amino radical with the elimination of one molecule of water; identically the same reaction occurring when proteids are treated with formaldehyde; proteids being a mixture of amino-acids or their derivatives.

The universally accepted name for products resulting from the treatment of proteids by formaldehyde is anhydro-methylene proteids. Since there is no free iodin employed in our process nor any formed during the preparation of our compound, no iodin substituted proteid could be formed. The iodin combines with the bismuth which is capable of entering combinations with proteids, forming under certain conditions products in which the bismuth is in a masked state. It would also appear that besides the iodin, oxygen is also combined with the iodin so that the name bismuth-oxy-iodid-anhydro-methylene proteid would seem to be fully justified.

While the compound resulting from our process may vary slightly as to its composition, the following figures are typical as indicating the proportions of its constituents:—viz., bismuth, 18 to 20% and iodin 10 to 20%; the remainder being proteid and moisture.

The compound resulting from our process is designed for use in the antiseptic treatment of wounds, and also is valuable as an intestinal antiseptic when taken inwardly.

We claim as our invention:—

1. The process of preparing an antiseptic compound which consists in acting upon a solution of a proteid with bismuth oxy-iodid and reacting upon the precipitate with formaldehyde, whereby bismuth oxy-iodid anhydro methylene proteid is formed, substantially as described.

2. The process of preparing an antiseptic compound which consists in acting upon a solution of a proteid with bismuth oxy-iodid in an excess of alkali, and reacting upon the precipitate with formaldehyde, substantially as described.

3. The process of preparing an antiseptic compound which consists in acting upon a solution of a proteid with bismuth oxy-iodid in a nascent state, and reacting upon the precipitate with formaldehyde, substantially as described.

4. The process of preparing an antiseptic compound which consists in acting upon a solution of a proteid with bismuth oxy-iodid in a nascent state and in the presence of sodium acetate, and then reacting upon the resulting product with formaldehyde, substantially as described.

5. The process of preparing an antiseptic compound which consists in acting upon a solution of a proteid with bismuth oxy-iodid in a nascent state and in the presence of sodium acetate and sodium bicarbonate, and then reacting upon the resulting compound with formaldehyde, substantially as described.

6. The process of preparing an antiseptic compound which consists in dissolving a proteid in a solution of 14 lb. of sodium bicarbonate in about 40 gal. of water, adding to said solution 2 lb. 2 oz. of sodium acetate and 1 lb. 15 oz. of potassium iodid in 2 gal. of water, and then a solution of 5 lb. 8 oz. of bismuth nitrate in 13 pints of 50% acetic acid, boiling the same, and reacting upon the precipitate with 8 pints of a 40% solution of formaldehyde, substantially as described.

In testimony whereof, we have signed our names to this specification, in the presence of two subscribing witnesses.

JOSEPH L. TURNER.
CHARLES E. VANDERKLEED.

Witnesses:
WILLIAM E. BRADLEY,
JOS. H. KLEIN.